Patented June 16, 1936

2,044,400

UNITED STATES PATENT OFFICE 2,044,400

SULPHONATION OF OILS OR THEIR FATTY ACIDS

Alfred Rheiner and Jakob Link, Basel, Switzerland, assignors to the firm of Chemical Works formerly Sandoz, Basel, Switzerland No Drawing. Application May 28, 1935, Serial No. 23,946. In Switzerland June 5, 1934

8 Claims. (Cl. 87—12)

The present invention relates to softening, cleaning, deterging, emulsifying and dispersing agents and to a process for their manufacture.

It has been found that very valuable and active products are obtained if glycerides of saturated or unsaturated fatty acids or the fatty acids themselves or mixtures thereof are treated with sulphonating agents containing the sulphuric acid esters of polyhydric alcohols.

In order to carry out the present invention, the glycerides of saturated or unsaturated fatty acids or the fatty acids themselves of any origin are heated with sulphuric acid esters of polyhydric alcohols, whereby sulphonation occurs and water soluble derivatives are obtained.

As glycerides of saturated or unsaturated fatty acids or the fatty acids themselves which can be used for the present process products such as cocoa fat, palm oil, olive oil, castor oil, fish oil and the free acids obtainable from these products or mixtures thereof can be cited.

As polyhydric alcohols there can be used compounds such as glycol, polyethyleneglycol, glycerine, sorbit or derivatives of such compounds containing at least two free hydroxy groups such as mono-alkyl-, aralkyl or aryl ethers of glycerine.

As sulphonating agents which can be used for the manufacture of sulphuric acid esters of polyhydric alcohols sulphuric acid of various concentrations and content of sulphurtrioxide or chlorosulphonic acid may be used. The relative proportions of sulphonating agents and of polyhydric alcohols used in the sulphonating operation can be varied within wide limits. The present invention is, therefore, characterized by the use as sulphonating agent of mixtures of sulphuric acid esters of polyhydric alcohols, which contain a more or less great quantity of free sulphuric acid.

The sulphonating operation can be carried out at temperatures between 0° and 80° C., preferably at temperatures of 35° to 65° C.

Sometimes it is advantageous to carry out the sulphonation in presence of diluting agents such as chloroform, carbontetrachloride, glacial acetic acid and the like.

According to the quantity of the sulphonating agent used, low or high sulphonated products are obtained.

By using 100 parts of the glycerides of saturated or unsaturated fatty acids or the fatty acids themselves and 30 to 60 parts of the sulphuric acid esters of a polyhydric alcohol, containing a certain amount of free sulphuric acid, low sulphonated products are obtained.

But by using 100 parts of the glycerides of saturated or unsaturated fatty acids or the fatty acids themselves and 150 parts of the sulphuric acid esters of a polyhydric alcohol containing a certain amount of free sulphuric acid, high sulphonated products are obtained.

Therefore, it is possible, by varying the quantity of the sulphonating agent, to prepare products of any desirable degree of sulphonation.

The isolation of the products can be carried out in various ways. The high sulphonated compounds are preferably isolated by pouring the reaction mass into water while stirring and by neutralizing the excess of acid, preferably after addition of ice. The sulphonated product can then be isolated from its solution by salting out or by concentrating its solution preferably in vacuo.

The low sulphonated products are preferably isolated by neutralizing the reaction mixture with an alkali and preferably in presence of ice, in order to avoid local superheating.

According to the process of manufacture used and to the degree of sulphonation obtained, products which are suitable for various applications are obtained. By using a small quantity of sulphonating agent, products are obtained, which are especially suitable for softening purposes and for emulsifying fats, oils, waxes, paraffins and other water-insoluble products.

By sulphonating the glycerides of saturated or unsaturated fatty acids or the fatty acids themselves with larger quantities of sulphonating agents, products are obtained, which possess besides emulsifying properties, an excellent derging and cleaning action.

All the products prepared according to the present invention and which are more or less colored powders or pastes possess an excellent stability towards hard water and acids and can, therefore, be used for various purposes in the textile, leather and other allied industries.

One object of the present invention is, therefore, a process for the manufacture of softening, cleaning, deterging, emulsifying and dispersing agents, consisting in sulphonating glycerides of saturated or unsaturated fatty acids or the fatty acids themselves or mixtures thereof with sulphuric acid esters of polyhydric alcohols containing a certain amount of free sulphuric acid.

Another object of the present invention is a process for the manufacture of the said valuable products, characterized in that the sulphonation of the glycerides of saturated or unsaturated fatty acids or the fatty acids themselves is carried out with sulphonating agents consisting of or containing sulphuric acid esters of glycerine.

Still another object of the present invention is the method for sulphonating glycerides of saturated or unsaturated fatty acids or the fatty acids themselves, consisting in treating the glycerides of saturated or unsaturated fatty acids or the fatty acids themselves with mixtures consisting of sulphuric acid esters of polyhydric alcohols and containing free sulphuric acid at temperatures of 0° to 80° C., if desired in presence of diluting agents.

Still another object of the present invention are the softening, cleaning, deterging, emulsifying and dispersing agents, which are more or less colored, solid or fluid products, soluble in water and possessing an excellent stability towards hard water and acids and which can be used in the textile, leather and allied industries.

The following examples, without being limitative, illustrate the present process, the parts being by weight.

*Example 1*

Into 150 parts of olive oil there are introduced while stirring and at 15°–45° C., 60 parts of glycerine-sulphuric acid prepared by intermixing at 20°–25° C. 92 parts of sulphuric acid monohydrate, 246 parts of oleum containing 67% of $SO_3$ and 92 parts of anhydrous glycerine. After stirring the mixture for 1½ hours at 52–54° C., the same is cooled down to 25° C., mixed with 35 parts of ice and neutralized by means of a concentrated aqueous solution of soda ash.

The product thus obtained is a yellowish paste possessing good softening properties.

*Example 2*

To 150 parts of melted cocoa fat there are added while stirring at 28–50° C. 155 parts of glycerine-sulphuric acid prepared by mixing at 20–25° C. 92 parts of sulphuric acid monohydrate, 369 parts of oleum of 67% of $SO_3$ and 92 parts of anhydrous glycerine. After stirring for an hour at 50–55° C., the sulphonation mass is cooled down to 20° C., poured on ice and neutralized by means of caustic soda. By evaporating the reaction product thus obtained in vacuo, a yellowish paste possessing good deterging properties and a very good stability towards hard water will be obtained.

*Example 3*

100 parts of cocoa fat acids are mixed while stirring at 30–45° C. with 175 parts of glycerine-sulphuric acid (prepared as indicated in Example 2) and the sulphonation is carried out by heating the reaction mixture for one hour at 50–55° C. The water-soluble reaction product thus obtained is then worked up as described in Example 2 and yields a product with good deterging properties.

*Example 4*

To 150 parts of castor oil there are added at 15–45° C. while stirring 150 parts of glycerine-sulphuric acid (prepared as described in Example 2). After stirring for one hour at 50–55° C. the reaction mass becomes completely soluble in water, and is then worked up as described in Example 2. By salting out the sulphonation product from its aqueous solution, a yellowish thick oil of excellent fastness towards hard water will be obtained.

*Example 5*

To 98 parts of naphthenic acid there are added at 30–40° C. 190 parts of glycerine-sulphuric acid (prepared as described in Example 1) and the mass is stirred for 1½ hours at 50–55° C., after which time the mass becomes completely soluble in water. The reaction mixture is then poured on water and the new sulphonated product isolated by salting it out from its aqueous solution in form of an oil, possessing an excellent stability towards hard water.

What we claim is:—

1. Process of the character described comprising sulphonating an aliphatic compound selected from the class consisting of saturated and unsaturated fatty acids and their glycerides with glycerine trisulphuric acid in presence of free sulphuric acid at a temperature of 35° to 65° C.

2. Process of the character described comprising sulphonating olive oil with glycerine trisulphuric acid in presence of free sulphuric acid at a temperature of 35° to 65° C.

3. Process of the character described comprising sulphonating cocoa fat with glycerine trisulphuric acid in presence of free sulphuric acid at a temperature of 35° to 65° C.

4. Process of the character described comprising sulphonating cocoa fat acids with glycerine trisulphuric acid in the presence of free sulphuric acid at a temperature of 35° to 65° C.

5. The herein described softening, cleaning, deterging, emulsifying and dispersing agents from the interaction, at a temperature of 35° to 65° C. and in presence of free sulphuric acid, of a non-sulphonated glyceride of the class consisting of a saturated or unsaturated fatty acid or a fatty acid and glycerine trisulphuric acid.

6. The herein described softening, cleaning, deterging, emulsifying and dispersing agent from the interaction, at a temperature of 35° to 65° C. and in the presence of free sulphuric acid, of olive oil and glycerine trisulphuric acid.

7. The herein described softening, cleaning, deterging, emulsifying and dispersing agent from the interaction, at a temperature of 35° to 65° C. and in the presence of free sulphuric acid, of cocoa fat and glycerine trisulphuric acid.

8. The herein described softening, cleaning, deterging, emulsifying and dispersing agent from the interaction, at a temperature of 35° to 65° C. and in the presence of free sulphuric acid, of cocoa fat acids and glycerine trisulphuric acid.

ALFRED RHEINER.
JAKOB LINK.